United States Patent [19]

Uchiyama et al.

[11] Patent Number: 5,544,523
[45] Date of Patent: Aug. 13, 1996

[54] PHYSICAL QUANTITY SENSOR ARRANGEMENT

[75] Inventors: Kaoru Uchiyama, Oomiya-machi; Mitsukuni Tsutsui, Naka-machi; Shotaro Naito, Katsuta; Seiji Suda, Mito, all of Japan

[73] Assignee: Hitachi, Ltd., Tokyo, Japan

[21] Appl. No.: 206,219

[22] Filed: Mar. 7, 1994

Related U.S. Application Data

[63] Continuation of Ser. No. 792,421, Nov. 15, 1991, abandoned.

[30] Foreign Application Priority Data

Nov. 16, 1990 [JP] Japan .................................. 2-310261

[51] Int. Cl.⁶ ........................................................ G01F 15/02
[52] U.S. Cl. ............................... 73/118.2; 73/198; 359/180
[58] Field of Search ........................... 73/861.77, 861.78, 73/198, 118.2; 359/135, 163, 180, 182

[56] References Cited

U.S. PATENT DOCUMENTS

| | | | |
|---|---|---|---|
| 4,584,883 | 4/1986 | Miyoshi et al. | 73/861.24 |
| 4,884,215 | 11/1989 | Zboralski et al. | 73/204.14 |
| 4,916,689 | 4/1990 | Bielinski | 359/135 |
| 5,081,710 | 1/1992 | de Groof et al. | 359/182 |
| 5,237,441 | 8/1993 | Nhu | 359/163 |

*Primary Examiner*—Stephen Chin
*Assistant Examiner*—Timothy J. May
*Attorney, Agent, or Firm*—Antonelli, Terry, Stout & Kraus

[57] ABSTRACT

An air flow sensor unit for an internal combustion engine control system which detects an air flow rate and outputs an optical signal corresponding to the detected air flow rate to an external equipment including a bridge circuit including a temperature sensitive resistor which detects the air flow rate and outputs a first electrical signal indicative of a voltage amplitude corresponding to the detected air flow rate; a first converting circuit which converts the first electrical signal outputted from the bridge circuit into a second electrical signal indicative of a digital value corresponding to the voltage amplitude of the first electrical signal; a second converting circuit including a laser diode, for converting the second electrical signal outputted from the first converting circuit into the optical signal having the same digital value as that of the second electrical signal; a housing for accommodating the bridge circuit, first converting circuit and second converting circuit; and an apparatus of a lens and optical fiber cable secured integrally to the housing for transmitting the optical signal outputted from the second converting circuit to an external equipment.

8 Claims, 8 Drawing Sheets

PHYSICAL QUANTITY SENSOR ARRANGEMENT

This application is a continuation of Ser. No. 07/792,421, filed Nov. 15, 1991, now abandoned.

BACKGROUND OF THE INVENTION

The present invention relates to a physical quantity sensor apparatus and, in particular, relates to a physical quantity sensor apparatus which outputs detected information in a form of an optical signal and is applicable for use as an air flow sensor used in an automobile engine control system.

In a conventional automobile engine control system disclosed in JP-A-63-179217(1988), the signal transmission between sensors at a variety of locations, and a control unit is generally performed by voltage signals via electrical signaling lines. Therefore, their sensors such as those disclosed in JP-A-62-153711(1987) are constructed to output the detected information in the form of an electrical signal.

On one hand, presently, the number of detected information in an automobile has been increasing and the type of detected information has been diversifying. A light-weight automobile is highly desired in order to improve fuel consumption. To provide such requirements, the development of the LAN system in an automobile has been advanced wherein a wireharness which is a bundle of wires is eliminated, and information is transmitted via an optical fiber cable.

The developement of LAN system in an automobile wherein the optical fiber cable is used as the signal transmission means has obtained a certain agreeable level as an optical communication system for an automobile. However, as will be apparent from the above mentioned prior document, the variety of conventional sensors used for an automobile are still constructed so as to output the detected information in a form of electrical signal such that a satisfactory interface between the output portions of the sensors and the other portions of the LAN system in an automobile is not obtained. Further, as a LAN system is built in an automobile by making use of sensors which output electrical signals, electro-optical converters hare required between the optical fiber cable constituting the signal transmission means and the variety of sensors thereby the structure thereof is complex and a troublesome assembly thereof results.

SUMMARY OF THE INVENTION

An object of the present invention is to provide a physical quantity sensor apparatus which has a structure suitable for being used with a LAN system in an automobile, which is used for diversified purposes and in which the respective constructions are connected via an optical transmission means, and the signal transmission means is light weight and outputs the detected physical quantity information from its output portion in the form of an optical signal. The physical quantity sensor apparatus transmits the detected physical quantity information to a predetermined portion in the system and further increases the accuracy of the transmitted detection information.

Another object of the present invention is to provide a compact and simple structured physical quantity sensor apparatus having the above constitution which facilitates assembly work.

The physical quantity sensor apparatus of one aspect of the present invention which detects a physical quantity and outputs the detected signal to an outer equipment achieves the above objects by including a detecting element which detects the above physical quantity and outputs an electrical signal corresponding to the physical quantity and a control circuit which processes the electrical signal outputted from the detecting element, in which the control circuit converts the electrical signal outputted from the detecting element into an optical signal and outputs the same.

In the physical quantity sensor arrangement of one aspect according to the present invention, the control circuit is constructed by a first converting unit wherein the electrical signal outputted from the detecting element is converted into another electrical signal and a second converting unit wherein the other electrical signal outputted from the first converting unit is converted into the optical signal.

The physical quantity sensor arrangement of another aspect according to the present invention is constructed by a detecting element which detects a physical quantity, a first converting unit which converts the detected signal from the detecting element into an electrical signal and a second converting unit which converts the electrical signal outputted from the first converting unit into the optical signal.

In the physical quantity sensor apparatus of the both aspects of the present invention, the first converting unit converts a voltage signal having a voltage amplitude corresponding to a physical quantity into another electrical signal having a frequency corresponding to the voltage amplitude, and the second converting unit converts the other electrical signal into the optical signal having the same frequency.

In the physical quantity sensor apparatus of the both aspects of the present invention, the first converting unit converts a voltage signal having a voltage amplitude corresponding to a physical quantity into an electrical signal indicative of a digital value corresponding to the voltage amplitude, and the second converting unit converts the other electrical signal into an optical signal indicative of the same digital value.

In the physical quantity sensor apparatus of both aspects of the present invention, the first and second converting units are formed on a single semiconductor substrate.

The physical quantity sensor apparatus of both aspects of the present invention includes a housing for accommodating the above-mentioned sensor main body and photo transmitting means for transmitting the signal to other external equipment wherein the photo transmission means is fixed to the housing and integrated into a sensor unit.

In the physical quantity sensor apparatus according to the present invention, the housing includes a thick wall portion and the photo transmitting means is supported and fixed at the thick wall portion.

In the physical quantity sensor apparatus according to the present invention, a light emitting portion is provided at the region of the second converting unit on the semiconductor substrate and the photo transmitting means is arranged so as to face the light emitting portion.

In the physical quantity sensor apparatus including the above construction according to the present invention, a cap member is disposed for protecting the semiconductor substrate and the photo transmission means is attached on the cap member.

In the physical quantity sensor apparatus including the above construction according to the present invention, the detecting element is a temperature sensitive body formed in a cylindrical shape or in a plate shape for detecting an air flow rate.

In the physical quantity sensor apparatus including the above construction according to the present invention, the optical signal generating means is a laser diode.

In the physical quantity sensor apparatus according to the present invention, a physical quantity which constitutes the detection object is at first detected as an electrical signal by the detecting element; the electrical signal outputted from the detecting element is converted into another electrical signal by the first converting unit and thereafter the other electrical signal is converted into an optical signal by the second converting unit. Therefore, the signal corresponding to the physical quantity which constitutes the detetion object is finally outputted as the optical signal. In general the first and second converting units are integrally formed as a control circuit, and more specifically both the first and second connecting units are formed on a common single semiconductor substrate, forming thereby a compact physical quantity sensor apparatus.

The first converting unit functions to convert an electrical signal corresponding to a voltage amplitude which corresponds to the physical quantity into an electrical signal indicative of a frequency which corresponds to the voltage amplitude or into an electrical signal corresponding to a digital value which corresponds to the voltage amplitude, and thereafter the respective converted electrical signals are converted into corresponding optical signals by the second converting unit. In both instances, the physical quantity sensor apparatus outputs signals in an optical form, and the detected signals are transmitted to the external equipments via an optical fiber cable of the photo transmitting means.

A stable and durable attachment structure is employed for the attachment of the optical fiber cable which is provided at the output portion of the physical quantity sensor apparatus. The optical fiber cable provided at the output portion is also integrated into the physical quantity sensor arrangement as a part thereof.

According to the present invention, the physical quantity sensor arrangement is constructed to output a detected signal in the form of an optical signal; the signal transmission between the sensor apparatus and external equipment which process the output signals from the sensor arrangement as their inputs is performed via the optical signals so that multi-telecommunication is realized in the LAN system of an automobile. In the signal transmission via the optical fiber cable, the invasion of external noise into signal lines is prevented, and stable, and accurate sensor output signals are transmitted to the external equipment; and the control accuracy of the entire system is enhanced.

Further, the first circuit unit which drives the detecting element and obtains a detected voltage signal and the second circuit unit which converts the voltage signal into an optical signal are formed on a single semiconductor substrate; the size of the physical quantity sensor apparatus is reduced, and mass production thereof at a low cost is obtained.

Still further, the optical fiber cable which introduces signals from the sensor apparatus to the external equipment is integrally formed with the housing of the sensor apparatus the handling of the physical quantity sensor arrangement is facilitated, and the physical quantity sensor apparatus is hardly damaged during transportation and assembly thereof to thereby maintain high quality.

DESCRIPTION OF THE PREFERRED EMBODIMENTS

Hereinbelow, embodiments of the present invention are explained with reference to the attached drawings.

Figure 1:
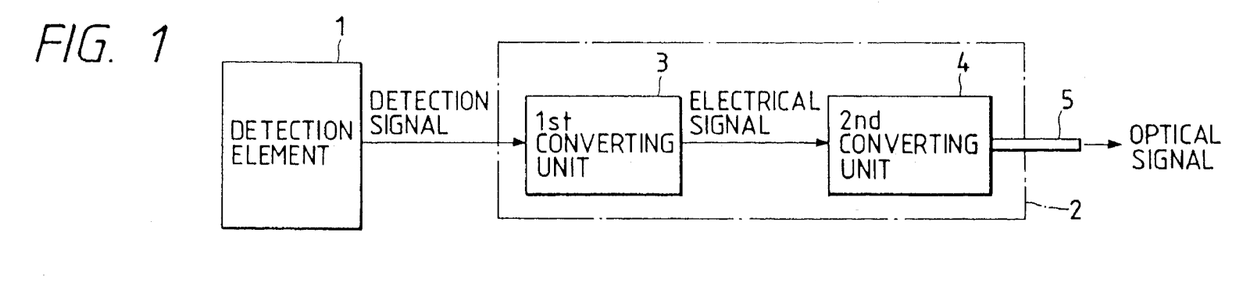
FIG. 1 is a block diagram showing a physical quantity sensor apparatus in accordance with to the present invention.

FIG. 1 shows an overview of the physical quantity sensor apparatus according to the present invention. In FIG. 1, a detecting element 1 detects a physical quantity and a control circuit 2 controls the detecting operation of the detecting element 1 as well as the electrical processing of an electrical signal corresponding to the detected physical quantity and converts the physical quantity data into an optical signal which is outputted. The control circuit 2 includes a first converting unit 3, which converts the detection signal outputted from the detecting element 1 into an electrical signal, and a second converting unit 4, which converts the electrical signal outputted from the first converting unit 3 into the optical signal. An optical fiber cable 5 which extends from the second converting unit 4 transmits the optical signal thus obtained from the second connecting unit 4 to external equipment. In such a construction, the detecting element 1, the control circuit 2 and the optical fiber cable 5 are integrated so as to constitute a sensor unit. Therefore, the physical quantity sensor arrangement including such a construction according to the present invention enables the direct output of the detected physical quantity in the form of an optical signal.

Figure 2:
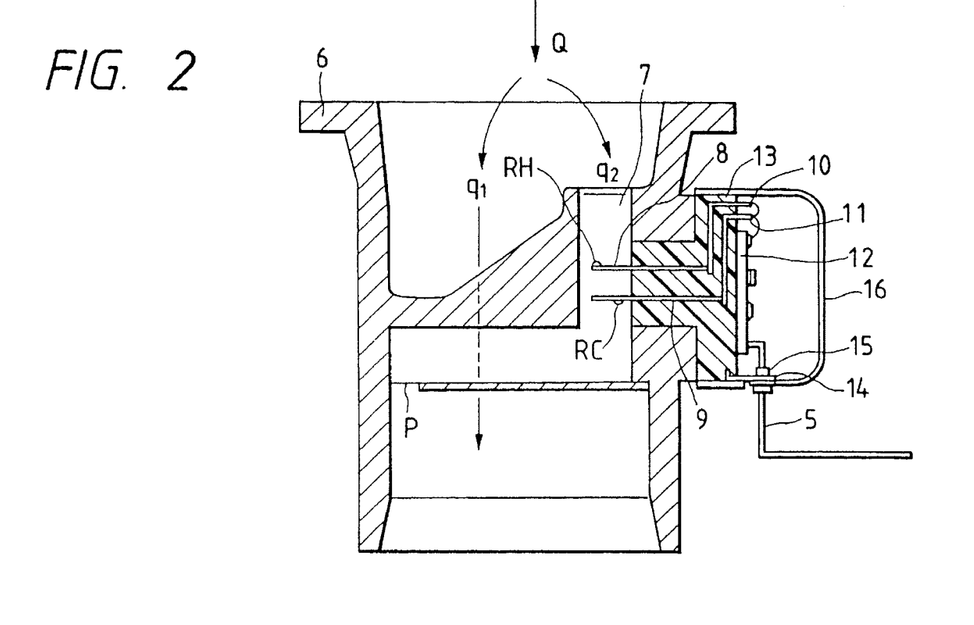
FIG. 2 illustrates a cross sectional view of an embodiment of a physical quantity sensor apparatus according to the present invention which includes an air flow sensor apparatus and which is spaced in an air intake passage of an automobile engine.
Figure 3:
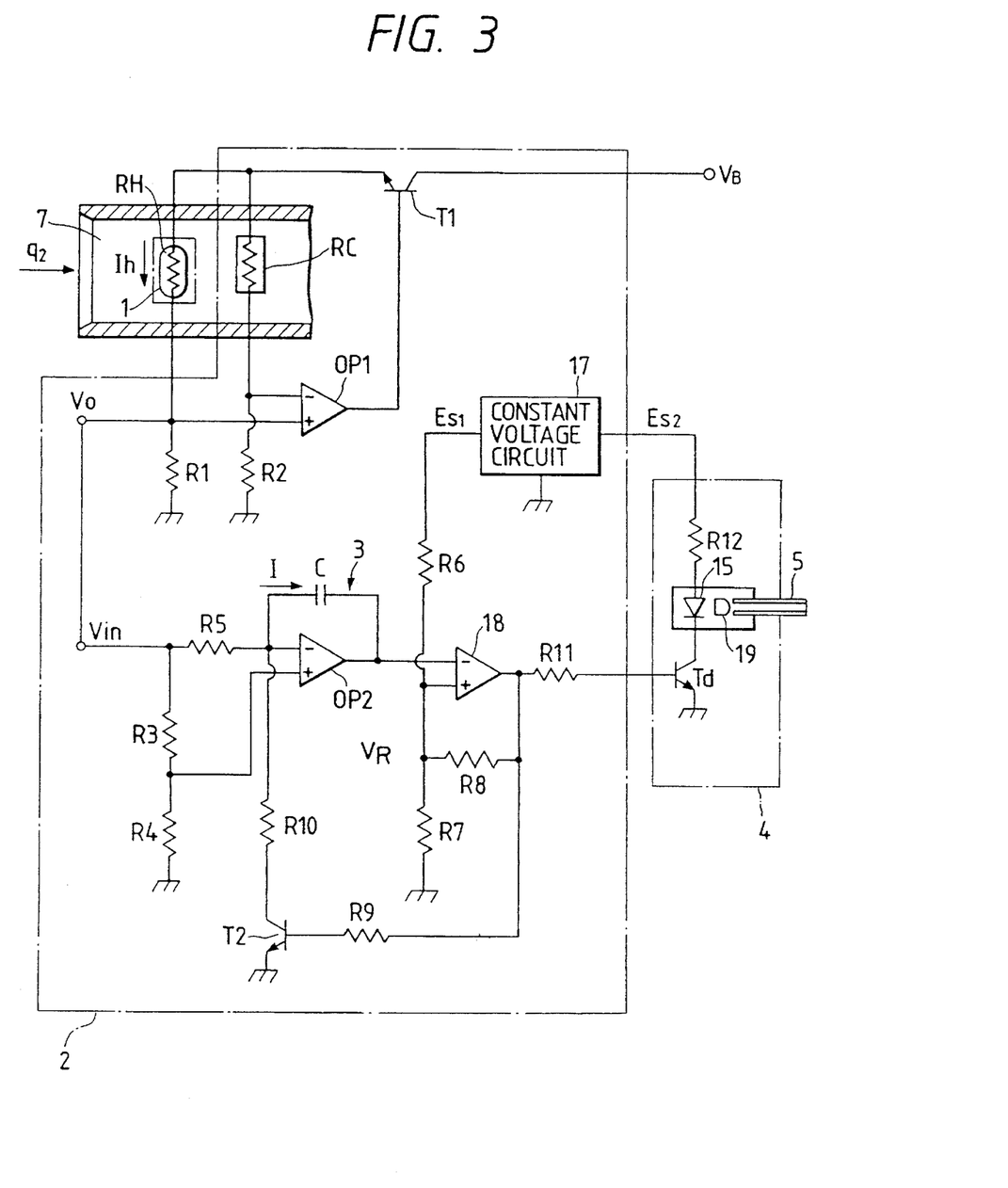
FIG. 3 is a circuit diagram of the air flow sensor apparatus as shown in FIG. 2.

FIG. 2 shows an embodiment of the physical quantity sensor arrangement including the above construction according to the present invention which is realized as an air flow sensor arrangement for detecting an intake air flow rate into automobile engine, and FIG. 3 shows a specific sensor circuit for the air flow sensor arrangement.

Figure 8:
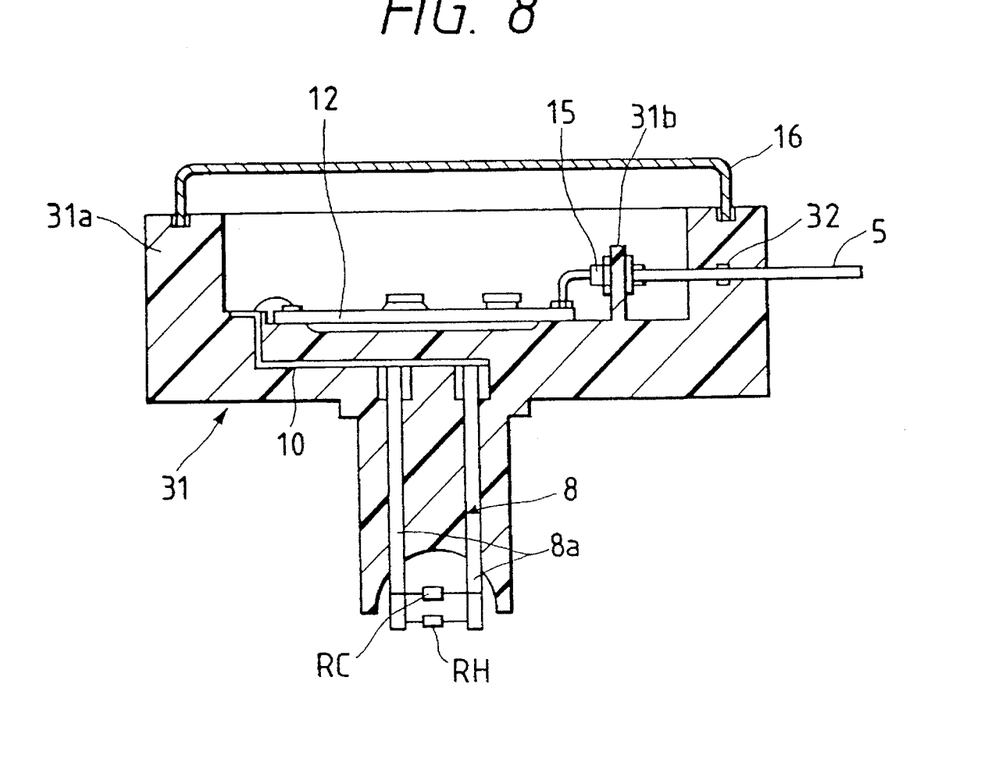
FIG. 8 is a vertical cross sectional view of another air flow sensor arrangement according to the present invention.
Figure 9:
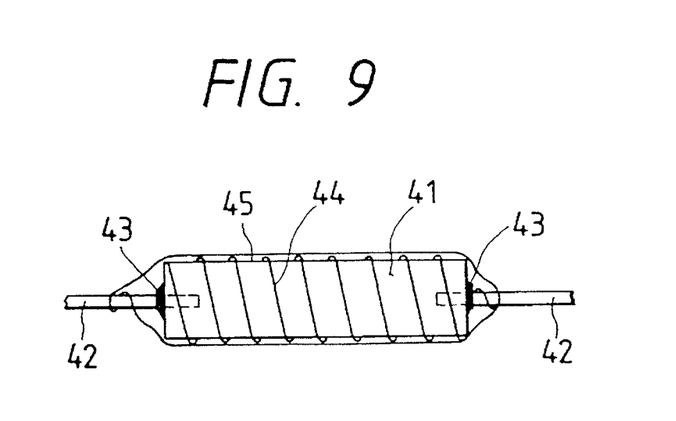
FIG. 9 is a front view of an exemplary temperature sensitive resistor body included in the above air flow sensor circuits.

In FIG. 2, conduit member 6 is provided with a passage through which intake air which includes the detected object, is introduced. The intake air Q branches into main passages an auxiliary passage 7 formed in the conduit member 6 and a branch ratio of the intake air is controlled such that air flow rate in the main passages is $q_1$ and the air flow rate in the auxiliary passage is $q_2$ the branched intake air is joined at a downstream point p and is fed to an engine combustion chamber. In the auxiliary passage 7, temperature sensitive resistor bodies RH and RC having such a structure as shown in FIG. 9 are disposed in a predetermined positional relationship. In FIG. 2, the temperature sensitive resistor bodies RH and RC are arranged so that the axes thereof are perpendicular to the sheet of the drawing. The temperature sensitive resistor bodies RH and RC are respectively connected to the corresponding sensor circuit portions formed on the circuit substrate 12 via pins 8 and 9 and leads 10 and 11. The respective pins 8 and 9 are constructed by a pair of two pin portions arranged in parallel, for instance, the pin 8, which is constructed by a pair of two pin portions 8a as shown in FIG. 8, and each of the temperature sensitive resistor bodies is disposed between the top ends of the respective two pin portions such that the two portions are bridged. A housing 13 is formed by plastic mold supports such as the pins 8 and 9 and the circuit substrate 12 and is secured to the side wall of the conduit member 6. A stay 14 of a metal fitting is inserted in the housing 13. A laser diode 15, that is, a light emitting diode which is included in the second converting unit 4 in FIG. 1, is attached on the inside position of the stay 14. A cover member 16 covers the circuit substrate 12 to protect the circuit substrate. The one end of the optical fiber cable 5 is connected at the outside position of the stay 14 so as to transmit the optical signal being input from the laser diode 15.

In the above construction, the housing 13, circuit substrate 12, cover member 16, temperature sensitive resistor bodies RH and RC and optical fiber cable 5 are integrated as an independent single sensor unit of a physical quantity sensor arrangement which detects the air flow rate and outputs the detected information in a form of an optical signal from the optical cable.

Now, the construction and operation of the sensor circuit formed on the circuit substrate 12 is explained with and as shown in FIG. 3.

In FIG. 3, as explained above, the two temperature sensitive resistor bodies RH and RC are disposed in the auxiliary passage 7 of the conduit member 6. The temperature sensitive resistor body RH functions as the detecting element 1 for detecting the physical quantity as shown in FIG. 1. These temperature sensitive resistors RH and RC constitute a bridge circuit together with resistors R1 and R2, a differential amplifier OP1 and a transistor T1 in the sensor circuit, wherein $V_B$ is the power source voltage. With this bridge circuit the resistance value Rh of the temperature sensitive resistor RH is controlled to a value determined by the following equation 1;

$$Rh = R2/R1 \cdot Rc \qquad (1)$$

wherein Rc is the resistance value of the temperature sensitive resistor RC.

In the equation 1, the resistance Rc corresponds to the temperature of the intake air flow rate $q_2$ to be detected, therefore the temperature of the temperature sensitive resistor body RH is maintained higher by $\Delta T°$ C. determined by the ratio R2/R1 than the intake air temperature corresponding to Rc.

On the other hand, the relationship between the current Ih for heating the temperature sensitive resistor body RH, and the intake air flow rate $q_2$ is approximated in the following equation 2 using the King's equation;

$$Ih^2 \cdot Rh = (A + B\sqrt{q_2})\Delta T \qquad (2)$$

A and B are constants.

As will be understood from the above equation, the current Ih is a function of the intake air flow rate $q_2$; therefore, the voltage Vo across the resistor R1 which is responsive to the current Ih constitute a voltage signal representing the air flow rate $q_2$, where the air flow rate $q_2$ is a portion of the total air flow rate Q which is determined by the structure of the auxiliary passage 7, thereby the total air flow rate Q is determined by detecting the air flow rate $q_2$.

Additionally, a constant voltage circuit 17 outputs two kinds of constant voltages $E_{s1}$ and $E_{s2}$, which are connected to predetermined portions in the sensor circuit. Further, a differential amplifier OP2, a hysteresis comparator 18, a capacitor C resistors R3–R10 and a transistor T2 constitute a voltage-frequency converting circuit, which corresponds to the first converting unit 3 as shown in FIG. 1. When the output of the comparator 18 is "0", in that low level, the transistor T2 is in an "off" condition so that a charging current I flows into the capacitor C as expressed in the following equation 3; ps $$I = \{1 - R_4/(R_3 + R_4)\}V_{in}/R_5$$

Due to the above charging current, the output of the differential amplifier OP2 is reduced below a reference input Vr of the comparator 18. The reference input Vr of the comparator 18 is formed by the constant voltage $E_{s1}$ outputted from the constant voltage circuit 17. At this moment, the condition of the comparator 18 is inverted, and its output is set to "1", a high level. Thereby, the transistor T2 is turned on, and the current which had been flowing to the capacitor C flows to the transistor T2 causing the capacitor to discharge current. As a result, the output of the differential amplifier OP2 begins to rise, and when the output thereof again exceeds the reference input Vr, the output of the comparator 18 is set to "0". Thereby, the transistor T2 is again set to an "off" state. Thereafter the above operation is repeated, and the input voltage Vin is converted into a switching signal having a predetermined frequency and is outputted from the comparator 18. The switching signal outputted from the comparator 18 is supplied to the second converting unit 4 of the next stage via a resistor R11. The frequency of the switching signal is expressed by the following equation 4;

$$f = 1/R4 \times C \times R5 \cdot 1/\Delta Vr \cdot Vin \qquad (4)$$

wherein $R_4(R_3 + R_4) = \frac{1}{2}$, $R5 = 2 \cdot R10$ $\Delta Vr$: hysteresis of comparator 18.

With the voltage-frequency converting circuit including the above construction, the detected information in a form of voltage signal is converted to a frequency signal.

The second converting unit 4, explained in connection with FIG. 1 is constituted by a transistor Td which is driven by the comparator 18 output, the laser diode 15 and a lens 19. The laser diode 15 is fed the constant voltage $E_{s2}$, via a resistor R12. Further, the laser diode 15 faces one end of the optical fiber cable 5 via the lens 19. With this construction, the electrical signal outputted from the comparator 18, in which the detected information is converted by the switching signal into a frequency signal, is converted into an optical signal at the second converting unit 4 and is outputted from the optical fiber cable 5 as an optical signal, thereby the air flow rate corresponds to the frequency of the optical signal.

As discussed above, an embodiment wherein an air flow rate constituting a physical quantity is outputted in a form of optical frequency signal is illustrated. Hereinblow, a second embodiment where an air flow rate is outputted in a form of optical digital signal is explained with reference to FIG. 4.

Figure 4:
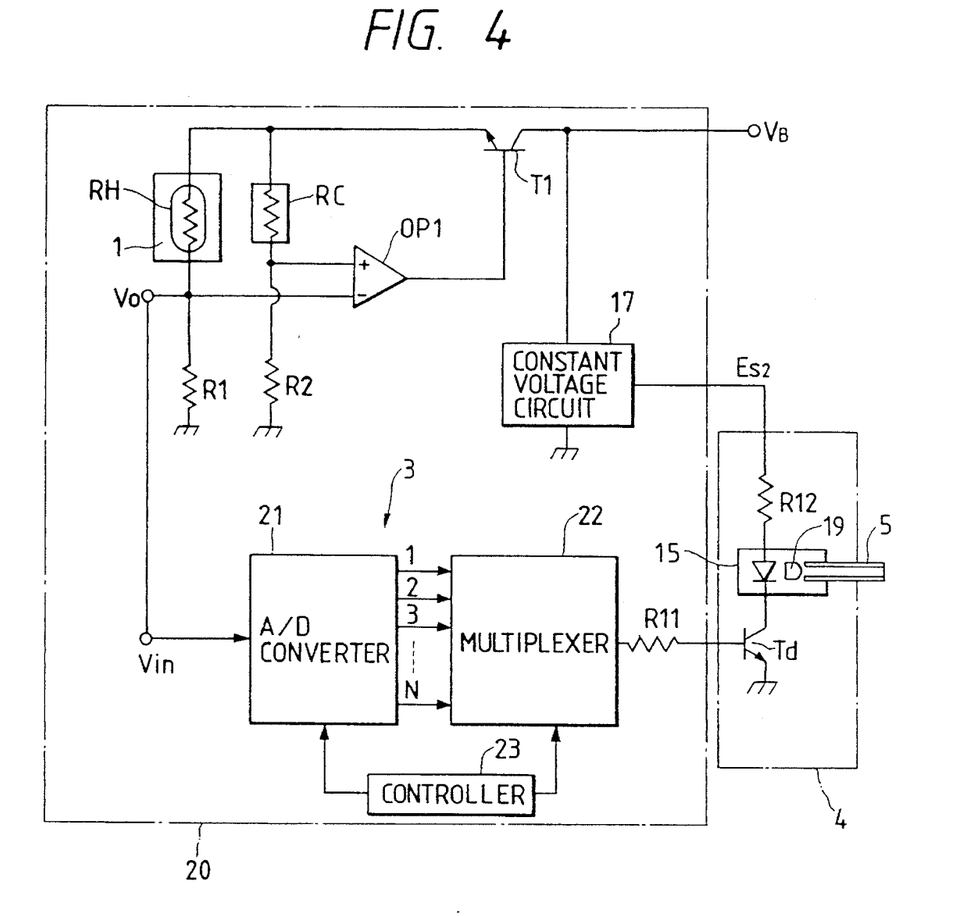
FIG. 4 is another circuit diagram of the air flow sensor apparatus as shown in FIG. 2.
Figure 5:
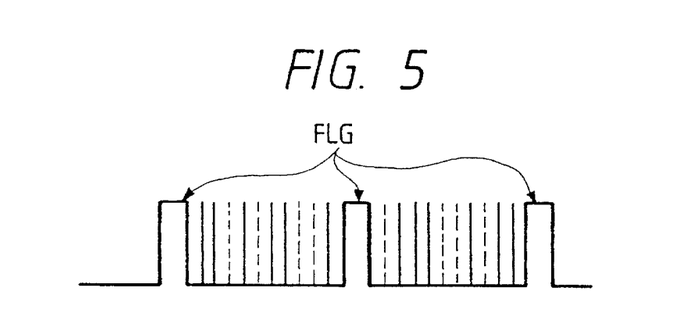
FIG. 5 is an exemplary waveform diagram of a digital signal generated in the circuit as shown in FIG. 4.

A control circuit 20 in FIG. 4 shows an embodiment where a detected signal is serially transmitted in a form of optical digital signal; as illustrated in FIG. 4, the same or equivalent elements as those in the above embodiment have the same reference numerals or symbols as those in the above embodiment. An A/D converter 21 converts the input Vin into a digital signal of N bits; a multiplexer 22 sequentially reads the output bits from the A/D converter 21, and a controller 23 controls the operation of the A/D converter 21 and the multiplexer 22. In accordance with the control of the controller 23, the A/D converter 21 first converts an input voltage Vin at a predetermined time into a digital signal of N bits and latches thereof; thereafter, the multiplexer 22 sequentially scans the digital signal from the first bit to Nth bit and outputs, for example, serial bit data of 10 bits as shown in FIG. 5. The "on" and "off" operation of the transistor Td in the second converting unit 4 is controlled in accordance with the respective bits in the serial data outputted from the multiplexer 22, and a digitized optical signal is outputted via the optical fiber cable 5. In FIG. 5, FLG is a flag signal which is added at the beginning of the respective data, indicating the initiation of data transfer and is outputted by the control of the controller 23; further, the state of the bits illustrated by a solid line indicates a signal "1", and the state of the bits illustrated by a dotted line indicates a signal "0".

In the second embodiment shown in FIG. 4 as explained above, the first converting unit 3 is constituted as a converting unit which converts a voltage signal into a digital signal. The other construction in the second embodiment is substantially the same as that in the first embodiment.

Figure 6:
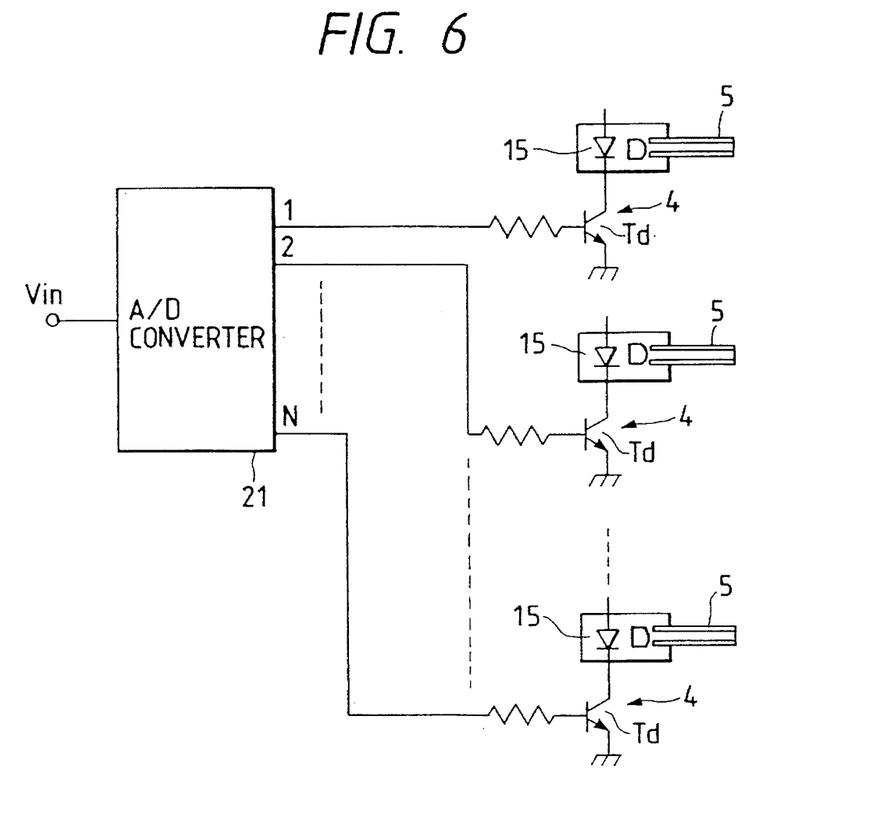
FIG. 6 is a modified circuit of a portion of the air flow sensor circuit shown in FIG. 4 for replacing the air flow sensor apparatus to construct a still another air flow sensor circuit wherein output bits are outputted in parallel

FIG. 6 shows a major portion of a third embodiment of the air flow sensor circuit, where a detected voltage signal is converted into a digital signal of N bits by the A/D converter 21, and the respective bits of the digital signal are transferred in parallel. As illustrated in FIG. 6, the present embodiment requires a number of the second converting units 4 corresponding to the respective bit number, therefore N laser diodes are required. However, according to the present embodiment, a high speed data transfer occurs. The bit number of the digital signal referred to in connection with FIG. 4 through FIG. 6 is determined based upon the resolution of the detected air flow rate and is generally in a range of 8–16.

With the constructions of the above second and third embodiments, the detected air flow rate signal is outputted in a form of the digital optical signal. The output in such a form is advantageous when the receiver which receives the output as an input is a digital processing unit of a computer.

Figure 7:
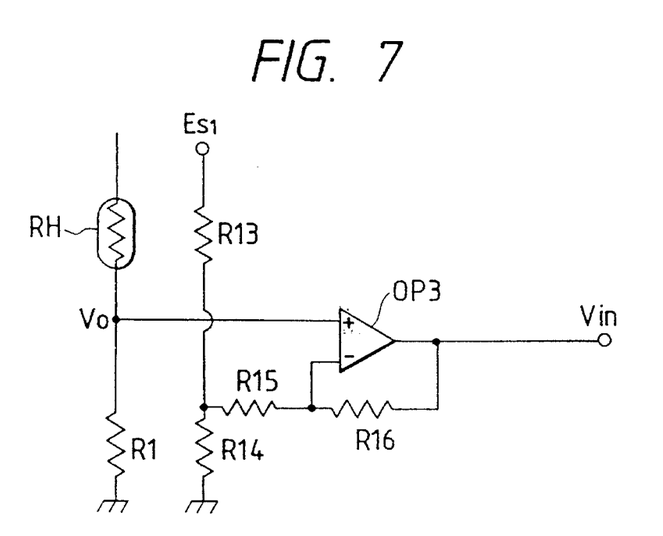
FIG. 7 is a circuit diagram which enables adjustment of the fluctuation in output air flow which is detected and applicable to the air flow sensor circuits of FIGS. 3, 4 and 6.

FIG. 7 shows a example of an output characteristic adjusting unit which can be added to the output portion of the detecting element 1 in the above respective embodiments. Since the temperature sensitive resistor body RH is produced by winding a platinum wire on a bobbin as shown in FIG. 9, the detection performance of the resistor body RH fluctuates due to the structure, and, as a result, the output voltage Vo, thereof, also fluctuates. Further, the structure of the auxiliary passage 7 may affect the fluctuation. Therefore, the fluctuation of the detection performance of mass-produced temperature sensitive resistor bodies RH must be adjusted. The adjustment circuit illustrated in FIG. 7 which is provided at the output portion of the detecting element 1 cancels out this fluctuation. The adjustment circuit includes a differential amplifier OP3 in which the detected voltage Vo is inputted to the positive input terminal and in which an offset voltage is to the negative input terminal in response to the fluctuation of the detected voltage Vo by employing resistors R13 and R14 and further through gain regulation of the adjustment circuit with respect to resistors R15 and R16. A stable input voltage Vin without fluctuation with respect to the total air flow rate Q can be obtained.

FIG. 8 shows an embodiment where the optical fiber cable 5 is integrated with a plastic housing 31. The plastic housing 31 includes a thick circumferential wall portion 31a and a raised portion 31b which functions as an attaching stay. The raised portion 31b has the same function as of the stay 14 in the embodiment shown in FIG. 2. The laser diode 15 is attached to the raised portion 31b which is formed near the circuit substrate 12 in the inner space of the housing 31, and, further, one end of the optical fiber cable 5 is also attached thereto. The optical fiber cable 5, having ring 32 secured therearound, is integrally formed with the housing 31 when the housing 31 is formed by plastic molding. By this attaching structure, the optical fiber cable 5 is firmly secured to the housing 31 so that movement of the optical fiber cable 5 due to possible vibration of optical fiber connectors mounted on an automobile is prevented. The same reference numerals or symbols as in the embodiment shown in FIG. 2 illustrated the same or equivalent elements in the present embodiment, and an explanation of these elements is omitted.

FIG. 9 shows a specific structure of a temperature sensitive resistor body used for the above explained air flow sensor apparatus. The temperature sensitive resistor body is constructed by securing leads 42 at both ends of a ceramic bobbin 41 via glass 43, winding a platinum wire 44 over the surface of the bobbin 41 and covering the same with a protective glass 45. Features of this temperature sensitive resistor body are a simple structure and a reduced size.

Figure 10:
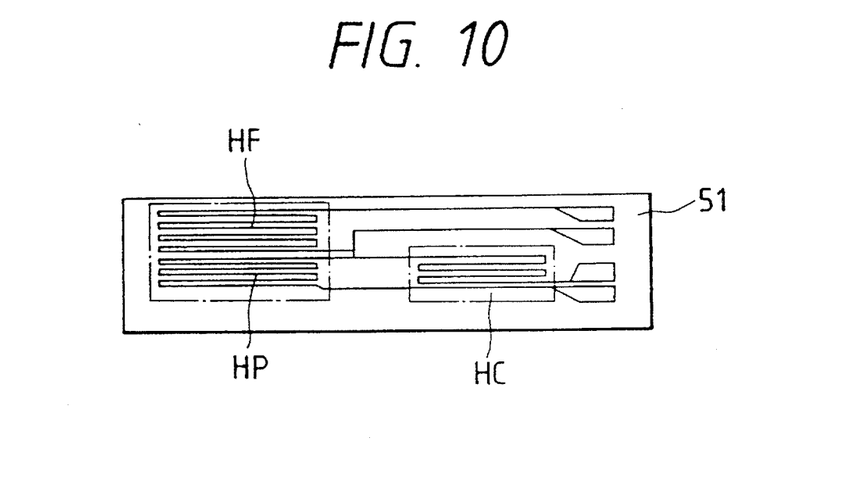
FIG. 10 is a front view of another exemplary temperature sensitive resistor body formed in a plate like shape and include three temperature sensitive resistors.

FIG. 10 shows a plate-like detecting element wherein temperature sensitive resistors HF, HP and HC of a platinum film are formed on a ceramic plate 51. The detecting element is used for constructing an indirect heating type air flow sensor arrangement.

Figure 11:
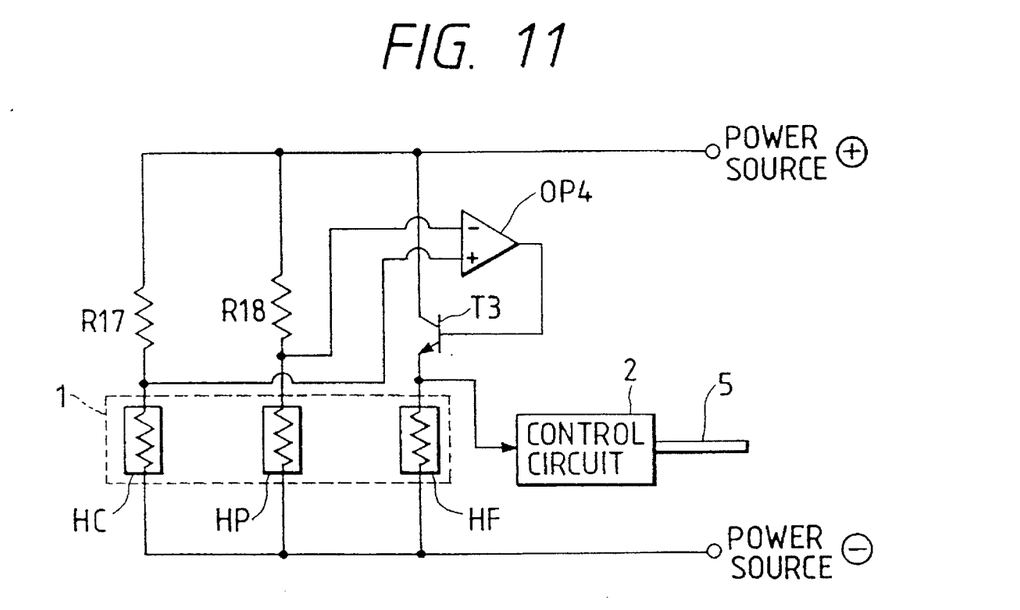
FIG. 11 is a schematic circuit diagram of an air flow sensor circuit according to the present invention using the temperature sensitive resistor body shown in FIG. 10.

FIG. 11 shows a schematic circuit diagram of an indirect heating type air flow sensor arrangement using a detecting element such as shown in FIG. 10, where a bridge circuit is formed by resistors R17 and R18, and the temperature sensitive resistors HP and HC; the temperature sensitive resistor HF is heated via a differential amplifier OP4 and a transistor T3, and the temperature difference between the temperature sensitive resistors HP and HC is constantly controlled while incorporating thermal conduction of the temperature sensitive resistors HF and HP to thereby detect the air flow rate. In this instance, by employing the terminal voltage across the temperature sensitive resistor HF, which functions as a heater, as the detection output, the detection response speed with respect to variation of air flow rate can be increased. The output voltage is converted into an optical signal by the control circuit 2 composed of the first converting unit 3 and the second converting unit 4, and the output of the control circuit 2 is outputted to the outside via the optical fiber cable 5.

Figure 12:
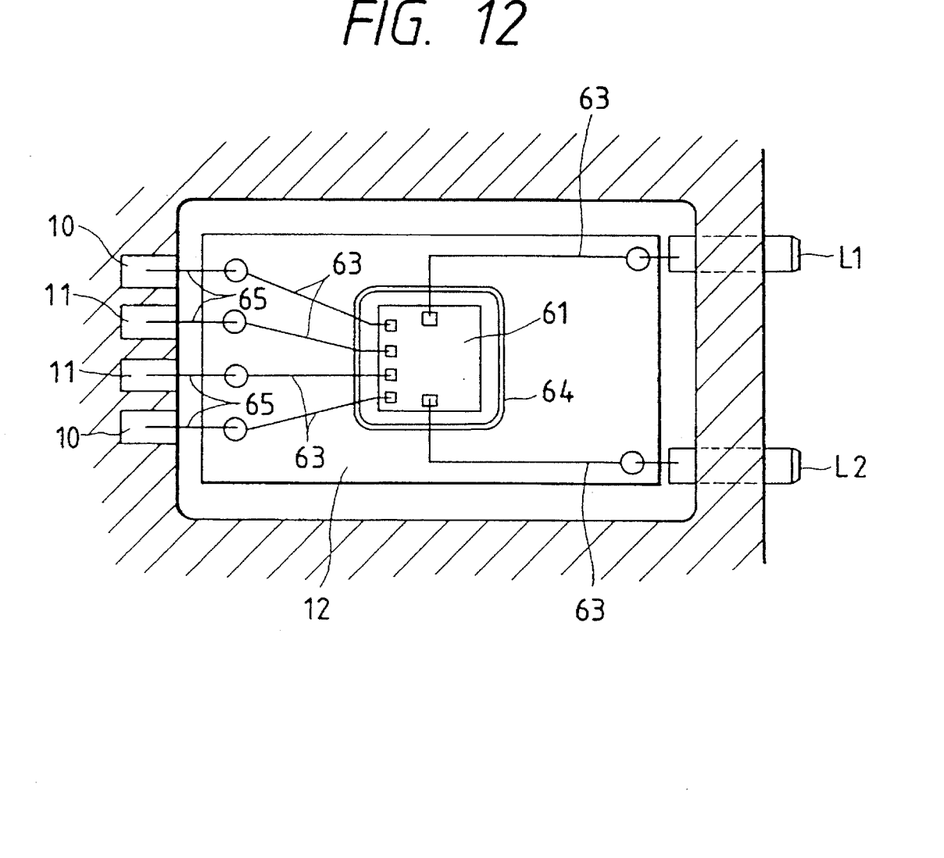
FIG. 12 is a partial cross sectional plane view of an air flow sensor arrangement according to the present invention wherein the air flow sensor circuit is formed on a single semiconductor substrate.
Figure 13:
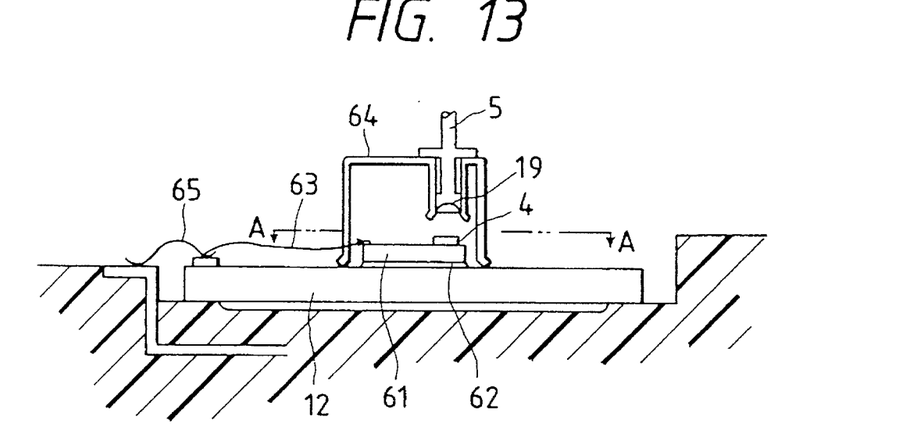
FIG. 13 is a side view of the air flow sensor arrangement shown in FIG. 12.

FIG. 12 and FIG. 13 show an embodiment where the first converting unit 3 and the second converting unit 4 constituting the control circuit 2 are formed on a single semiconductor substrate, and FIG. 12 is a partial cross sectional plane view of the embodiment, and FIG. 13 is a side view thereof. On a silicon chip 61, constituting the semiconductor substrate, the circuits of the first and second converting units such as shown in FIG. 3 and FIG. 4 are formed. The circuit is formed by making use of such technology as impurity diffusion into the semiconductor substrate and ion implantation into the semiconductor substrate. In FIG. 13, the second converting unit 4 on the silicon chip 61 is formed by a thin film of a laser diode element such as GaAs, GaAl and As by making use of such as molecular beam epitaxy. The silicon chip 61 is secured to the circuit substrate 12 via a conductive adhesive agent 62 and is electrically connected with the outside via wires 63. Further, the silicon chip 61 is entirely covered and protected by a cap 64 which is secured on the circuit substrate 12. A portion of the cap 64 is formed into a cylindrical shape with a small diameter, and in this cylinder portion, the lens 19 and one end of the optical fiber cable 5 are mounted. The lens 19 converges the beam emitted from the laser diode element 15 onto the one end of the optical fiber cable 5 to thereby transmit the detected signal to the outside as the optical signal. Wires 65 connect the terminals on the circuit substrate 12 with the terminals of the respective leads 10 and 11 and through terminals L1 and L2; an external driving power is supplied. Accordingly, the size of the physical quantity sensor arrangement thus formed is minimized.

Figure 14:
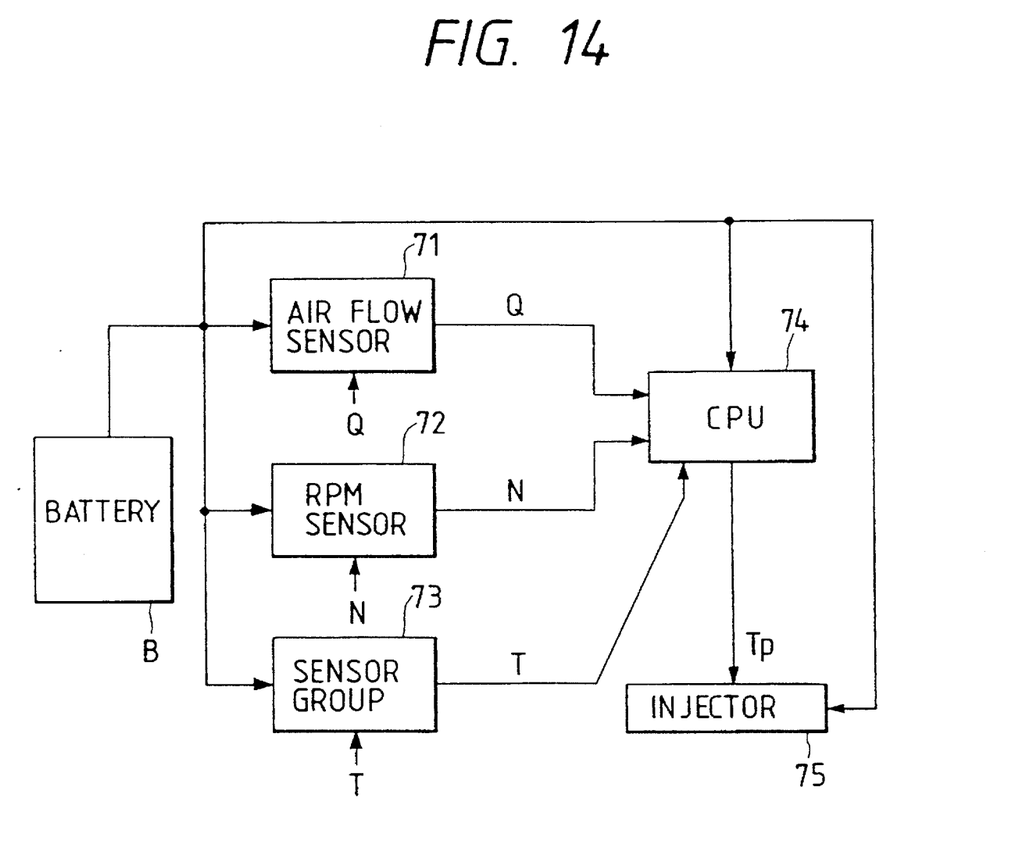
FIG. 14 is a block diagram of an automobile engine control system which is constructed with the physical quantity sensor arrangements according to the present invention.

FIG. 14 shows an engine control system wherein the physical quantity sensor apparatus according to the present invention are applied to various kinds of sensor apparatus.

The system includes an air flow sensor apparatus 71 as explained above, having an optical output signal indicative of an air flow rate Q, an RPM sensor apparatus 72 having an optical output signal indicative of crank shaft rotation number N and a sensor apparatus group having optical output signals indicative of, for example, cooling water temperature T. A central processing unit 4 sends a control command based on the detected information from the sensor arrangements 71–73 to injectors 75 which control fuel amount to be fed to the engine. The valve opening time Tp of the injectors 75 is expressed by the following equation 5;

$$Tp = K \cdot Q/N \cdot (1 + \alpha T) \quad (5)$$

wherein

K and α are constant

T: cooling water temperature.

A battery B supplies power to the respective sensor arrangements 71–73, the central processing unit 74 and the injector 75.

With the engine control system having the above construction, the electric noise which invades between the respective sensor arrangements 71–73 and the central processing unit 74 is eliminated, thereby an engine control system with a high degree of accuracy is realized.

We claim:

1. A physical quantity sensor unit for detecting a physical quantity and outputting an optical sensor signal corresponding to the detected physical quantity to an external apparatus, comprising:

detecting means for detecting the physical quantity and outputting a first electrical signal indicative of a voltage amplitude corresponding to the physical quantity;

a first converting unit for converting the first electrical signal output from said detecting means into a second electrical signal indicative of either of a frequency or a digital value corresponding to the first electrical signal;

a second converting unit for converting the second electrical signal output from said first converting unit into said optical sensor signal corresponding to the second electrical signal, said second converting unit including a laser diode for generating said optical sensor signal, wherein at least a portion of said detecting means, said first converting unit and said second converting unit, including said laser diode, are formed on a single semiconductor substrate;

a housing for accommodating said portion of said detecting means, said first converting unit and said second converting unit, formed on said single semiconductor substrate; and photo transmission means secured to said housing for transmitting said optical sensor signal output from said laser diode included in said second converting unit to said external apparatus.

2. A physical quantity sensor unit according to claim 1, wherein said detecting means includes a conductive element having a first portion within the housing coupled to the single semiconductor substrate and a second portion extending out of the housing, and wherein the detecting means includes a temperature sensitive resistor located on the second portion of the conductive element outside of the housing.

3. A physical quantity sensor unit according to claim 1, wherein said housing includes a cap member which is disposed over said single semiconductor substrate to protect the semiconductor substrate, and said photo transmission means is secured to said cap member.

4. An air flow sensor unit for detecting an air flow rate and outputting an optical sensor signal corresponding to the detected air flow rate to an external apparatus, comprising:

a bridge circuit including a temperature sensitive resistor for detecting the air flow rate, wherein said bridge circuit outputs a first electrical signal indicative of a voltage amplitude corresponding to the detected air flow rate;

a first converting circuit for converting the first electrical signal output from said bridge circuit into a second electrical signal indicative of either of a frequency or a digital value corresponding to the first electrical signal;

a second converting circuit for converting the second electrical signal output from said first converting circuit into said optical sensor signal corresponding to the second electrical signal, said second converting circuit including a laser diode for generating the optical sensor signal, wherein at least a portion of said bridge circuit other than said temperature sensitive resistor, said first converting circuit and second converting circuit, including said laser diode, are formed on a single semiconductor substrate;

a housing for accommodating said portion of said bridge circuit, said first converting circuit and said second converting circuit formed on said single semiconductor substrate; and an apparatus including a lens and an optical fiber cable secured to said housing for transmitting the optical sensor signal output from said laser diode included in said second converting circuit to the external apparatus.

5. An air flow sensor unit according to claim 4, wherein said temperature sensitive resistor includes a temperature sensitive conductor wire wound around a cylindrical bobbin.

6. An air flow sensor unit according to claim 4, wherein said temperature sensitive resistor includes a temperature sensitive conductor film formed on a plate.

7. An air flow sensor unit according to claim 5, wherein said bridge circuit further includes an output characteristic adjustment circuit for cancelling out a fluctuation in the first electrical signal.

8. An air flow sensor unit according to claim 4, wherein the bridge circuit includes a conductive element having a first portion within the housing coupled to the single semiconductor substrate and a second portion extending out of the housing, and wherein the temperature sensitive resistor for detecting the air flow rate is located on the second portion of the conductive element.

* * * * *